(No Model.)

T. B. DOOLEY.
MACHINE FOR MAKING CORD AND ROPE.

No. 373,800. Patented Nov. 22, 1887.

5 Sheets—Sheet 1.

Witnesses:
George Messinger
John A. Rennie.

Inventor,
Thomas B. Dooley
Per: Wright, Brown & Crossley.
his Attys.

(No Model.)

5 Sheets—Sheet 2.

T. B. DOOLEY.
MACHINE FOR MAKING CORD AND ROPE.

No. 373,800. Patented Nov. 22, 1887.

Witnesses:
George Messinger
John A. Rennie

Inventor,
Thomas B. Dooley,
Per: Wright, Brown & Crosley,
his Attys.

(No Model.) 5 Sheets—Sheet 3.
T. B. DOOLEY.
MACHINE FOR MAKING CORD AND ROPE.
No. 373,800. Patented Nov. 22, 1887.
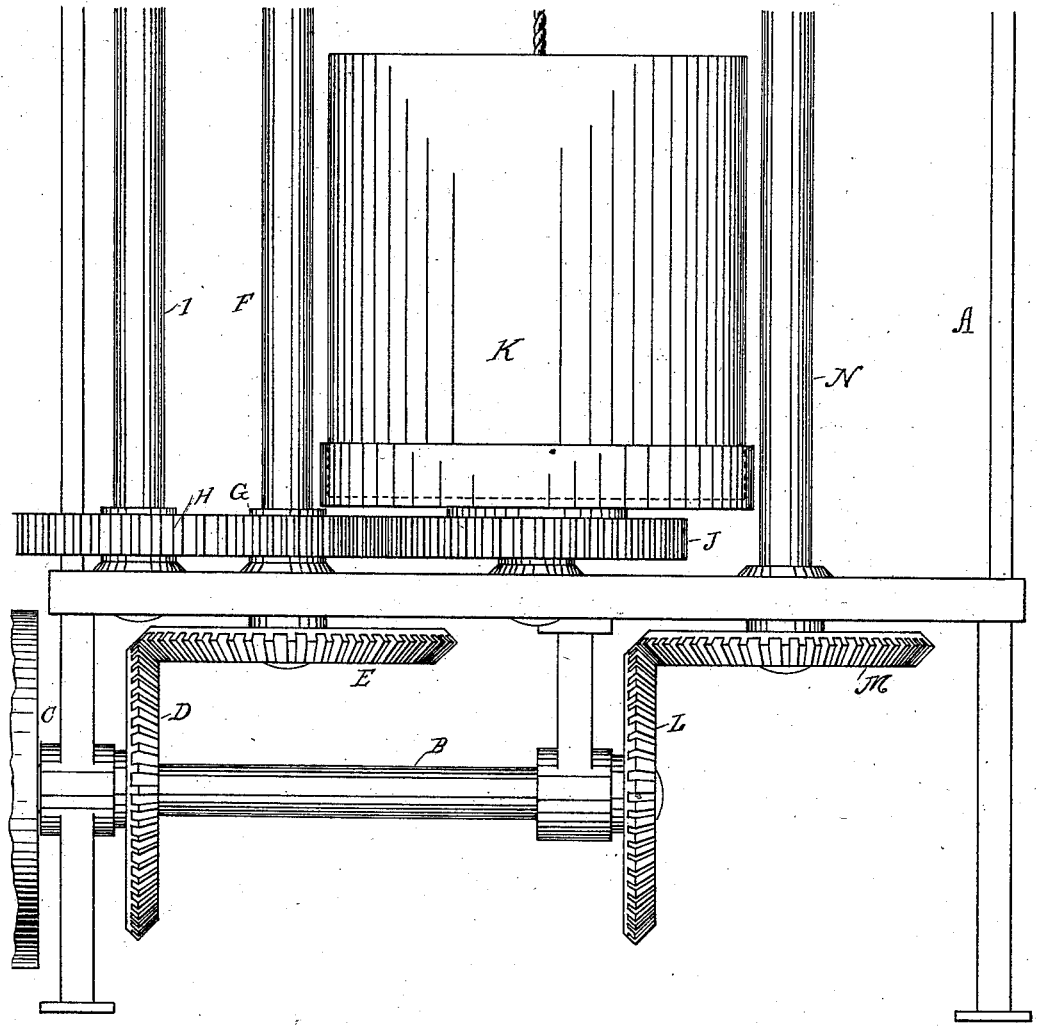
Fig: 3.
Witnesses:
Geo. Messinger
John A. Rennie
Inventor,
Thomas B. Dooley.
Per: Wright, Brown & Crossley.
his Attys.

(No Model.)  5 Sheets—Sheet 4.
T. B. DOOLEY.
MACHINE FOR MAKING CORD AND ROPE.
No. 373,800. Patented Nov. 22, 1887.
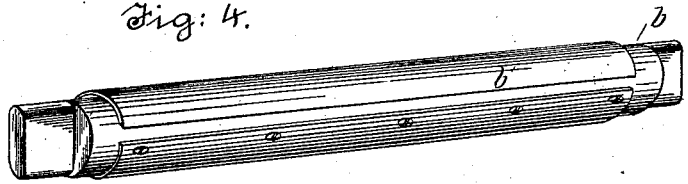
Fig: 4.
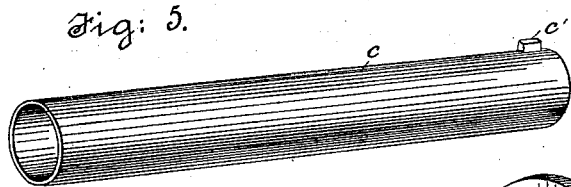
Fig: 5.
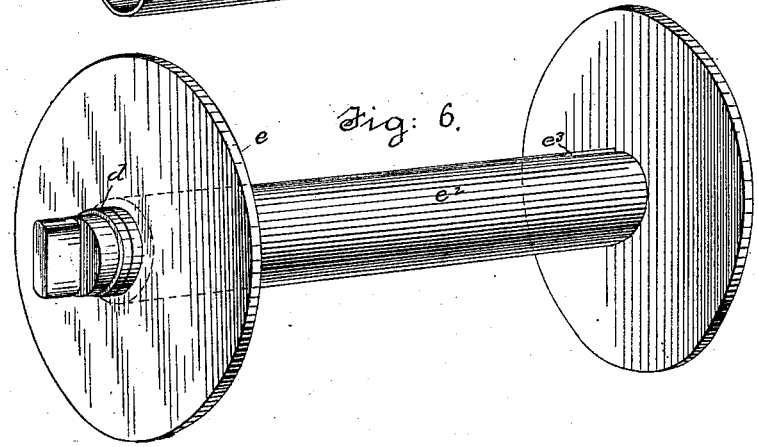
Fig: 6.
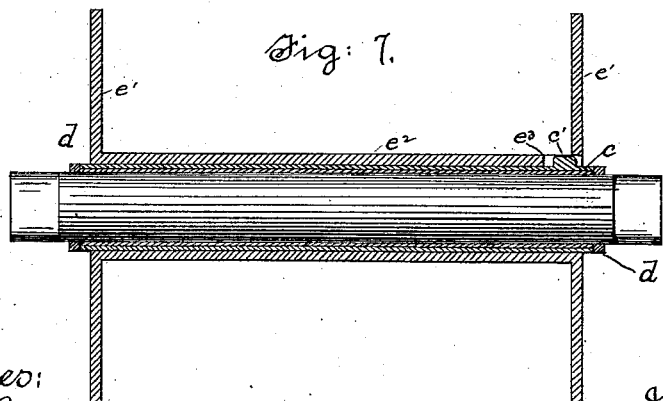
Fig: 7.
Witnesses:
John A. Rennie
George Messinger
Inventor
Thomas B. Dooley,
Per: Wright, Brown & Crossley.
his Attys.

(No Model.)

T. B. DOOLEY.

MACHINE FOR MAKING CORD AND ROPE.

No. 373,800. Patented Nov. 22, 1887.

Witnesses:
John A. Rennie
George Messinger

Inventor
Thomas B. Dooley.
Per: Wright, Brown & Crosley,
his Attys.

UNITED STATES PATENT OFFICE.

THOMAS B. DOOLEY, OF BOSTON, MASSACHUSETTS, ASSIGNOR, BY MESNE ASSIGNMENTS, TO THE NATIONAL LINE AND CORDAGE MACHINE COMPANY, OF PORTLAND, MAINE.

MACHINE FOR MAKING CORD AND ROPE.

SPECIFICATION forming part of Letters Patent No. 373,800, dated November 22, 1887.

Application filed April 10, 1886. Serial No. 198,411. (No model.)

*To all whom it may concern:*

Be it known that I, THOMAS B. DOOLEY, of Boston, in the county of Suffolk and State of Massachusetts, have invented certain new and useful Improvements in Machines for Making Cord and Rope, of which the following is a specification.

My invention relates to machines for making cords and ropes or cables, and has for its object to provide improved means whereby strands to form cords may be twisted together under uniform tension, and the cords may be in like manner laid up into the complete cord or rope, as well also to give a uniform twist to the cord or rope throughout its entire length, and to avoid the liability of the "kinking" of the completed cord or rope, as will be hereinafter described, and subsequently set forth in the claims.

Figure 1:
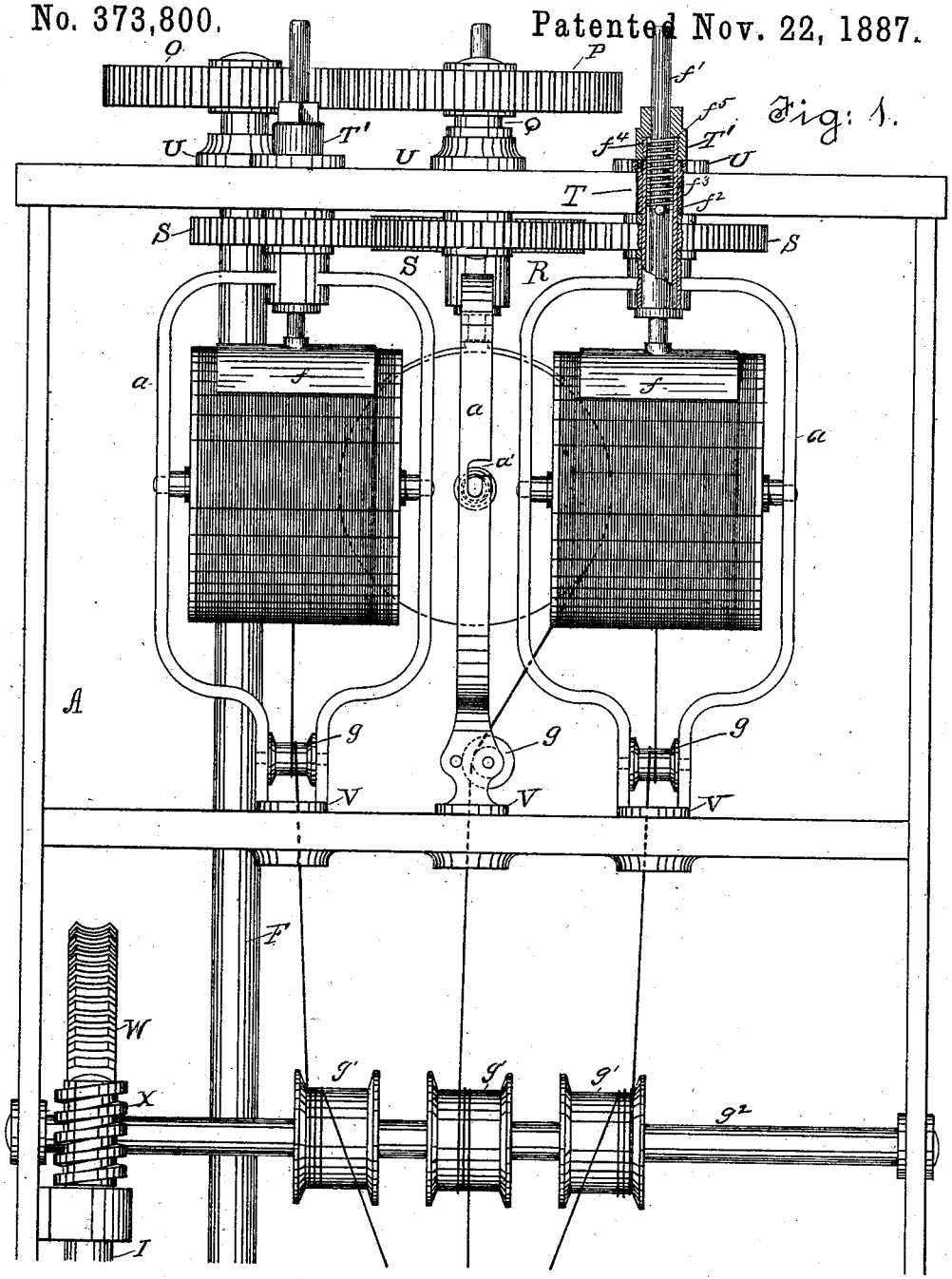
Figure 2:
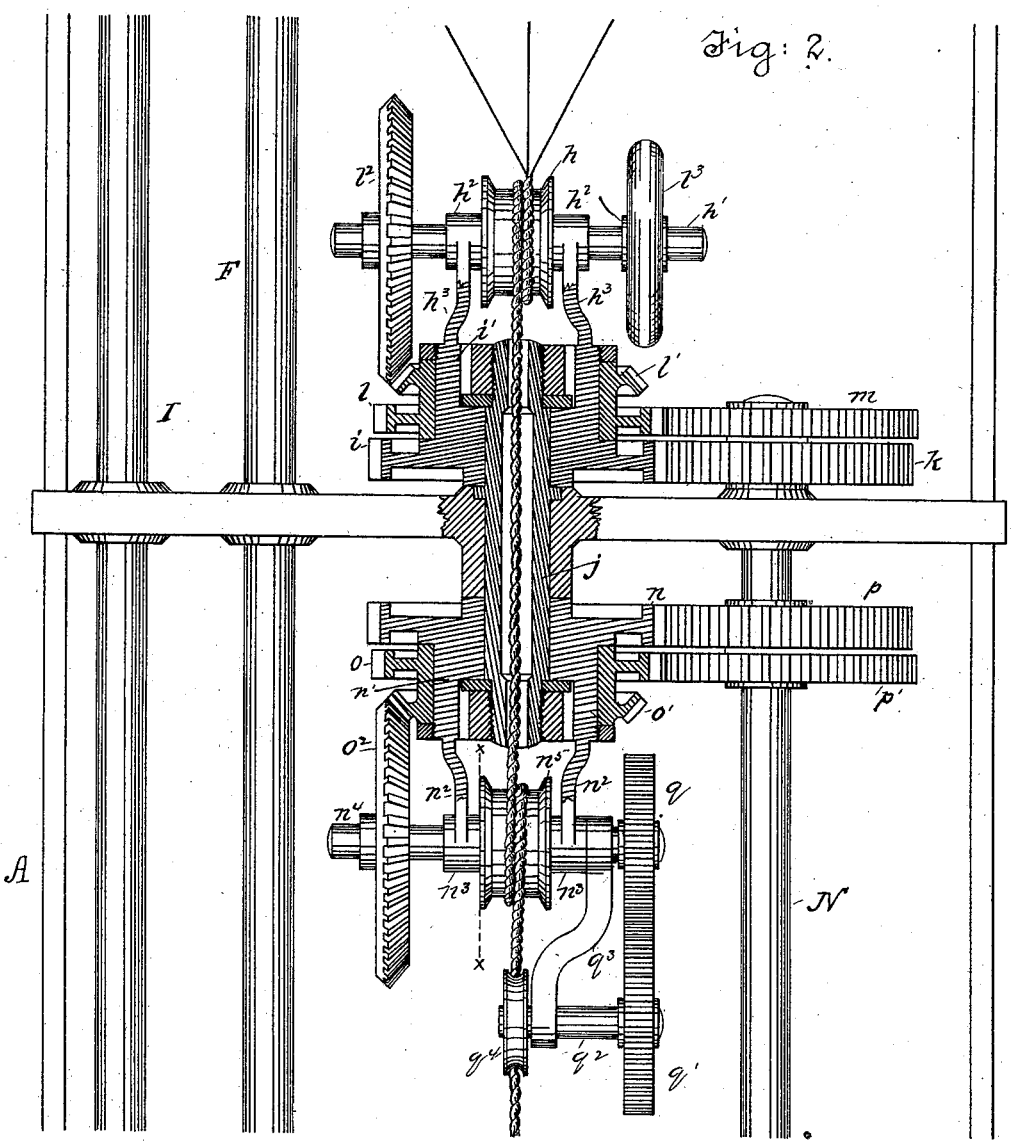
Figure 8:
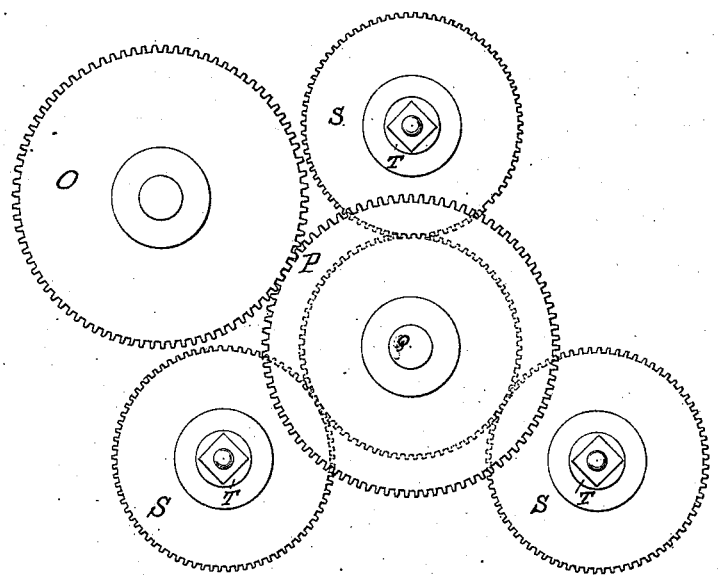
Figure 9:
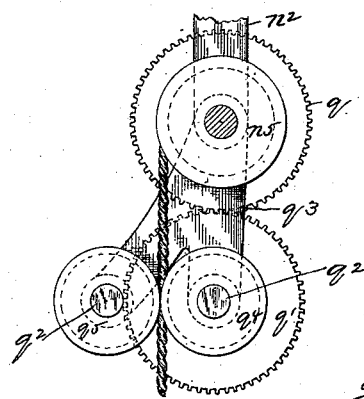

In the drawings hereto annexed and forming a part of this specification, Figure 1 represents a side view, partially in section, of the upper portion of my improved rope-making machine. Fig. 2 is a like view of the central portion of the machine, and Fig. 3 a side view of the lower portion of the machine. Fig. 4 is a perspective view of one of the spool or bobbin shafts or spindles. Fig. 5 is a perspective view of a sleeve designed to be slipped upon the part represented in Fig. 4. Fig. 6 represents a spool and its immediately-associated parts; and Fig. 7 is a vertical longitudinal section of the parts represented in Fig. 6, the spool-shaft being in elevation. Fig. 8 is a diagrammatic plan view of the gearing for revolving the fliers. Fig. 9 is a sectional detail on the line *x x*, Fig. 2, hereinafter described and referred to.

Similar letters of reference indicate similar parts in all of the figures.

In carrying out my invention I provide a suitable frame, A, consisting of upright posts united by cross or tie beams in any common or known way, which frame is adapted to support the various parts or devices comprising my machine, the construction and operation of which I will now proceed to set forth.

B represents the main shaft, journaled at one end in bearings secured to the frame of the machine and at the other end in a bearing formed in a bracket or hanger depending from the lower tie or cross bar of the frame. On the outer end of the main shaft is a pulley, C, (a portion only of which is shown in Fig. 3,) designed to receive a belt driven by any prime motor.

Secured to shaft B, just inside of the point at which it is journaled in the frame, is a bevel-gear, D, which meshes with another bevel-gear, E, secured to the lower end of an upright shaft, F, termed by me the "flier-driving shaft," having suitable bearings in the cross-bars of the frame, as shown. Just above the lower support of shaft F, and secured to the latter, is a gear-wheel, G, meshing at one side or point with a gear-wheel, H, secured to the lower end of an upright shaft, I, also having suitable bearings and supports in the frame, and at the other side or at another point meshing with a gear-wheel, J, secured to the stud or journal of a coiling or receiving can, K.

At the end of main shaft B opposite to that at which pulley C is attached thereto is secured a bevel-wheel, L, meshing with a like wheel, M, secured to the lower end of another upright shaft, N, journaled and supported in the frame similar to shafts F and I. The flier-driving shaft F extends above the frame of the machine, and has secured to its upper end a gear-wheel, O, which meshes with another wheel, P, secured to and revolving with a short shaft, Q, supported and having its bearings in the top of the frame. To the lower end of said short shaft Q is secured a gear-wheel, R, which meshes at different points with gear-wheels S S S, secured to the upper spindles, T, of the fliers *a*. Said spindles T turn in suitable boxes or bushings, U, secured in the top of the frame. The fliers *a* are provided at their lower ends with journals or arbors adapted to turn and be supported in boxes or bushings V, set in a cross-bar or portions of the frame A. Fliers *a* are similar in form to devices of the same name employed in certain well-known types of spinning-frames, and have oblong, or it may be square, open notches formed in their sides, as represented at *a'*, to receive the correspondingly-shaped ends of the spool-shafts *b*, this construction being for the purpose of preventing the spool-shafts from turning in the sides of the fliers. Each spool-shaft $b$ is provided with a split sleeve, $b'$, one edge of which is secured to the shaft, while the other edge, (which is free,) when the sleeve is in its normal position, will spring away therefrom, so that the sleeve will nearly surround the shaft without touching it excepting on the line where it is secured thereto, all as clearly represented in Fig. 4 of the drawings. A sleeve, $c$, as represented in Fig. 5, is provided, having a diameter adapting it to fit snugly on split sleeve $b'$ when the edges of the latter sleeve are pressed together, and when in this position said split sleeve will in turn fit rather snugly around a spool-shaft $b$, and at the same time exert considerable friction on the interior of the sleeve $c$, so that it will require some force to turn the latter sleeve on the former. A collar, $d$, of sufficient depth or thickness to bring its periphery flush with the outer surface of sleeve $c$, is shrunk upon or otherwise secured to each end of spool-shaft $b$, adjacent to the ends of the sleeves $b'$ $c$, when the latter are in position on the shaft to prevent their accidental removal.

$e$ represents a spool provided with the usual disks or sides, $e'$, of any suitable size, and having a hollow barrel, $e^2$, adapted to fit snugly over sleeve $c$, which latter device is provided at one end with a spline or stud, $c'$, constructed to fit a groove, $e^3$, formed in one end of the spool-barrel $e^2$, as is clearly shown in Figs. 6 and 7. With this construction of the spool and its adjuncts and with the parts in operative position, which is the position in which they are represented in Figs. 6 and 7, it will be seen that the spool cannot be turned independently of its shaft without turning with sleeve $c$, and the turning of the latter being, as has been stated, in some degree resisted by the friction of split sleeve $b'$, the turning of the spool on its shaft will of course be likewise resisted.

In the operation of forming a rope by my machine it is designed that each spool shall be supplied with any desired number of strands of twine simultaneously wound thereon, and the construction of the spool with respect to its shaft, and the manner of sustaining the latter in its flier, as described, is for the purpose of placing the strands under some tension in drawing them off from the spool, though the tension thus necessarily exerted on the strands is not sufficient to properly form cords for a rope. It may also be remarked in this connection that as the strands are always drawn off in the same direction and to the same point whether the spools be full or nearly empty, if no other provision were made than such as has been explained, the tension on the strands would vary in accordance with the amount of twine on the spools.

To provide for still further tension on the strands of the twine, and to render the same uniform, I provide a device which I will now proceed to describe.

$f$ represents a saddle constructed to rest upon the twine on the spool and fit thereover when the same is full. Extending up from the saddle and through the hollow spindle T of the flier is a stem or rod, $f'$, having a pin, $f^2$; secured therein a short distance below its center. Said hollow spindle T is provided with a sleeve or bushing, $f^3$, having a diameter sufficient to permit a spiral spring, $f^4$, to loosely surround the stem $f'$, which spring, bearing at its lower end on pin $f^2$ and at its upper end against a shoulder or offset, $f^5$, on nut T', tends to press saddle $f$ upon the twine on the spool, thus exerting a tension on the strands as they are drawn off; but as the bobbin becomes empty the resilient force of the spring relaxes and the said tension is lessened, compensating for the increased strain necessary to be exerted on the strands to turn the spools as the radius at which the draft is made varies with the varying diameter of the yarn on the spools. The twine drawn from the spools is carried once around guide-spools $g$, fitted to turn between the lower ends of the arms of the fliers, through the lower hollow journals or arbors of the fliers turning in boxes or bushings V, to and as many times as necessary around feed-spools $g'$, secured on shaft $g^2$, which is positively driven by a worm-gear, W, secured thereto near one of its ends, which gear W engages worm X, formed on the upper end of shaft I, which latter instrumentality, as has been seen, derives its motion from the main shaft through the medium of gears D E G. It will be seen from the description thus far given that as shafts F and I are turned fliers $a$ will be rapidly revolved, and the strands of twine slowly drawn off therefrom by the revolutions of feed-spools $g'$ will be twisted into cords, and that, the feed being positive, the twine will be drawn off and twisted at a regular rate, corresponding with the speed at which the machine is operated, resulting from the positive operation of the fliers and feed-spools.

$h$ represents the rope-flier spool of the rotating head, to which the twisted cords are led from the feed-spools $g'$, and by which flier-spool $h$ they are laid up into a rope, which latter is fed forward or drawn off by the flier-spool as fast as completed. Flier spool $h$ is rigidly secured to a shaft, $h'$, supported so as to turn in bearings $h^2$, formed in the upper ends of two arms, $h^3$ $h^3$, extending upward from the hub $i'$ of a gear-wheel, $i$, arranged so as to be supported by and to turn on a short hollow vertical shaft, $j$, sustained by the frame A in the center of the machine. Gear-wheel $i$ meshes with and is driven by a gear-wheel, $k$, secured on upright shaft N near the upper end thereof.

Arranged on hub $i'$ of gear-wheel $i$ and so as to be turned thereon is a gear-wheel, $l$, having a less number of teeth (say by one) than the former wheel. Said gear-wheel $l$ meshes with and is driven by a gear-wheel, $m$, affixed upon the upper end of shaft N, which latter gear is provided with one tooth more than gear-wheel $k$. A bevel gear-wheel, $l'$, formed integral with or secured to gear-wheel $l$, and arranged thereabove so as to also turn on hub $i'$, meshes with a bevel gear-wheel, $l^2$, of the same size, secured on one end of shaft $h'$, a balance-wheel, $l^3$, being secured on the other end of said shaft.

$n$ represents a gear-wheel similar in construction and arrangement on short hollow shaft $j$ to gear-wheel $i$; $n'$, the hub of gear-wheel $n$; $n^2$ $n^2$, arms depending from said hub and provided with bearings $n^3$ $n^3$ for a short shaft, $n^4$, having a drawing-spool, $n^5$, secured thereon between bearing-collars $n^3$.

$o$ represents a gear-wheel similar to wheel $l$, arranged on hub $n'$ so as to turn thereon, and formed integral therewith or secured thereto is a bevel gear-wheel, $o'$, meshing with a like bevel gear-wheel, $o^2$, affixed on the end of shaft $n^4$.

Secured to shaft N below gear-wheels $m$ and $k$ is a gear-wheel, $p$, meshing with gear-wheel $n$, and just below said wheel $p$, and also secured to shaft N, is a gear-wheel, $p'$, meshing with gear-wheel $o$. The parts sustained by and rotated on hollow shaft $j$ are those comprising what is termed by me the "head."

The construction and arrangement of the parts just described on the lower end of hollow shaft $j$ are the same (except in the respect hereinafter noted) as those on the upper end of said shaft; but the devices are arranged in reverse order, gear-wheel $n$ having one tooth more than gear-wheel $p$, by which it is driven, and gear-wheel $o$ has one tooth less than gear-wheel $p'$, by which it is driven, this construction providing for the driving of gear-wheel $o$ more rapidly than gear-wheel $n$, as wheel $l$ is revolved faster than wheel $i$.

Secured on the end of shaft $n^4$, opposite bevel-gear $o^2$, is a toothed wheel, $q$, meshing with a like toothed wheel, $q'$, affixed on one end of a shaft, $q^2$, turning in a bearing formed in the lower end of a bracket or arm, $q^3$, attached to and supported by one of the arms $n^2$. Secured to the end of shaft $q^2$, opposite toothed wheel $q'$, is a guide or drawing-off pulley, $q^4$, having a grooved periphery, and on a like shaft projecting from a branch of said bracket $q^3$ is another pulley, $q^5$, like in construction to pulley $q^4$, the edges of the peripheries of which pulleys roll upon each other, the rope or cord passing through the grooves between them, as shown in Fig. 9. The rotation of said pulleys serves to draw off the completed rope and guide it to the receiving or coiling can K.

The operation of the machine will now be readily understood. The several strands of twine leading from each spool are twisted together to form cords by the revolution of the fliers $a$, which cords, as fast as properly formed, are taken up and fed forward or downward to rope-flier spool $h$ of the rotary head, where they are laid up into a rope by the revolving head having motion imparted to it through the medium of the gear-wheels on shaft N.

As the rope is finished, it is necessary that it should be taken up and fed forward or downward at a regular rate, and this is accomplished by winding the rope once or twice, or more times, if necessary, around feed or flier spool $h$, which is slowly revolved with its shaft $h'$ through the medium of gear-wheels $m$ $l$ $l'$ $l^2$. The completed rope is led from spool $h$ through hollow shaft $j$ to and around take-up spool $n^5$, which is revolved at the same rate of speed as rope-flier spool $h$. The rope is then led between and drawn off by guide-pulleys $q^4$ $q^5$ on shafts $q^2$ $q^2$, driven by toothed wheels $q$ $q'$ from shaft $n^4$, to and laid or coiled in coiler-can K. If the entire twist put into the rope by the revolution of the revolving head were retained therein, the rope would "kink" or snarl when laid in the coiler-can in a way well understood by those skilled in the art. To provide against this happening I take out just enough of the twist put in where the cords are laid up into the rope to avoid the kinking of the rope, and this is accomplished by providing wheel $p$, by which endwise revolution is imparted to take-up spool $n^5$, with one or more teeth less than wheel $k$, by which rope-flier spool $h$ is in like manner revolved, so that take-up spool $n^5$ will be revolved endwise slightly slower than spool $h$, and the rope between spools $h$ and $n^5$ will have a portion of its twist taken out or removed before being laid into the coiler-can.

In properly-formed hawser-laid rope fifteen inches of cord are required to be laid up into a rope to form one foot in length of the latter, and the parts of my machine are so timed as to secure this end, and the feed and take-up spools, as also the twisting mechanism, being all positively operated, an even tension on each strand and cord laid into the rope, as also an even twist thereon and on the rope, is secured throughout. If it should be desired to put more twist in the strands drawn from the spools than the machine equipped as here shown is capable of accomplishing, it will be necessary only to change gears O and P, replacing the former with a larger gear and the latter with a smaller, and the operation of the other part of the machine can be regulated in the same manner in a way that will be readily understood by mechanics and need not be here described.

I do not confine myself or expect to be confined to the precise construction and arrangement of devices shown, as these may be varied within the limits of mechanical skill.

Having described my invention, I claim—

1. The combination, in a cord and rope making machine, of a series of flier-frames, each adapted to receive a spool with a plurality of strands, gearing for rotating said frames to twist the strands carried thereby into cords, a head at which said cords are formed into rope, provided with feed and take-up spools, and gearing for imparting a double rotation to said feed and take-up spools to effect an axial and endwise rotation of the same, the endwise rotation of the take-up spool being at a slower rate of speed than that of the feed-spool, substantially as set forth.

2. The combination, in a cord and rope making machine, of a series of flier-frames, each adapted to receive a spool with a plurality of strands, gearing for rotating said frames to twist the strands carried thereby into cords, spools $g'$, for receiving said cords, means for actuating said spools $g'$, a head at which said cords are formed into rope, provided with feed and take-up spools, and gearing for imparting a double rotation to said feed and take-up spools to effect an axial and endwise rotation of the same, the endwise rotation of the take-up spool being at a slower rate of speed than that of the feed-spool, substantially as set forth.

3. The combination of a shaft, $j$, feed and take-up spools, and gearing for imparting a double rotation to said feed and take-up spools to cause them to rotate axially and endwise, the endwise rotation of the take-up spool being slower than that of the feed-spool, substantially as set forth.

4. A head provided with feed and take-up spools, mechanism, substantially as set forth, to impart a double rotation to said feed-spool to effect an axial and endwise rotation of the same to lay up a number of cords or strands into a rope and feed the latter forward as laid, and mechanism to impart a similar double rotation to the said take-up spool, but effecting a slower endwise rotation thereof, whereby the rope is taken up and a slight amount of the twist put into the same by the feed-spool is removed, substantially as described.

5. The combination, with take-up spool $n^5$ and its revolving shaft, of the gear-wheel $q$, gear-wheel $q'$, and peripherally-grooved take-up pulleys $q^4 q^5$, and means for supporting said pulleys and last-mentioned gear-wheel, as set forth.

6. The combination, in a cord and rope machine, of a series of flier-frames, each adapted to receive a spool with a plurality of strands to form cords, gearing for rotating said flier-frames, a shaft, $j$, a hub, $n'$, mounted thereon, bearings $n^2 n^2$, carried by said hub, a take-up spool, $n^5$, mounted in said bearings and upon which the cords are laid in rope form, devices, substantially as described, intermediate of said take-up spool and flier-frames for feeding forward the cords, twisting the same into rope, and feeding forward the rope as twisted, means for rotating said hub on said shaft $j$, and devices for rotating the take-up spool in its bearings, gear-wheels $q q'$, peripherally-grooved take-up pulleys $q^4 q^5$, a coiler can or receptacle, and gearing for revolving the same, substantially as set forth.

7. The combination, with the fliers $a$, having the square notches or holes $a'$, of the spool-shaft $b$, having square ends corresponding to said square holes $a'$, split sleeve $b'$, sleeve $c$, spline $c'$, and spool $e$, provided with the hollow barrel $e^2$, having the groove $e^3$, as set forth.

8. The combination, in a cord and rope making machine, of a series of flier-frames, each adapted to receive a spool with a plurality of strands, a hollow spindle for each flier, having a gear-wheel, gearing for revolving said gear-wheel, stem $f'$, located in said spindle, spring $f^5$, pin $f^2$, nut T', and a saddle, $f$, suspended on said stem, and twisting and coiling devices, substantially as set forth.

In testimony whereof I have signed my name to this specification, in the presence of two subscribing witnesses, this 3d day of April, 1886.

THOMAS B. DOOLEY.

Witnesses:
ARTHUR W. CROSSLEY,
N. H. BROWN.